Patented Apr. 30, 1935

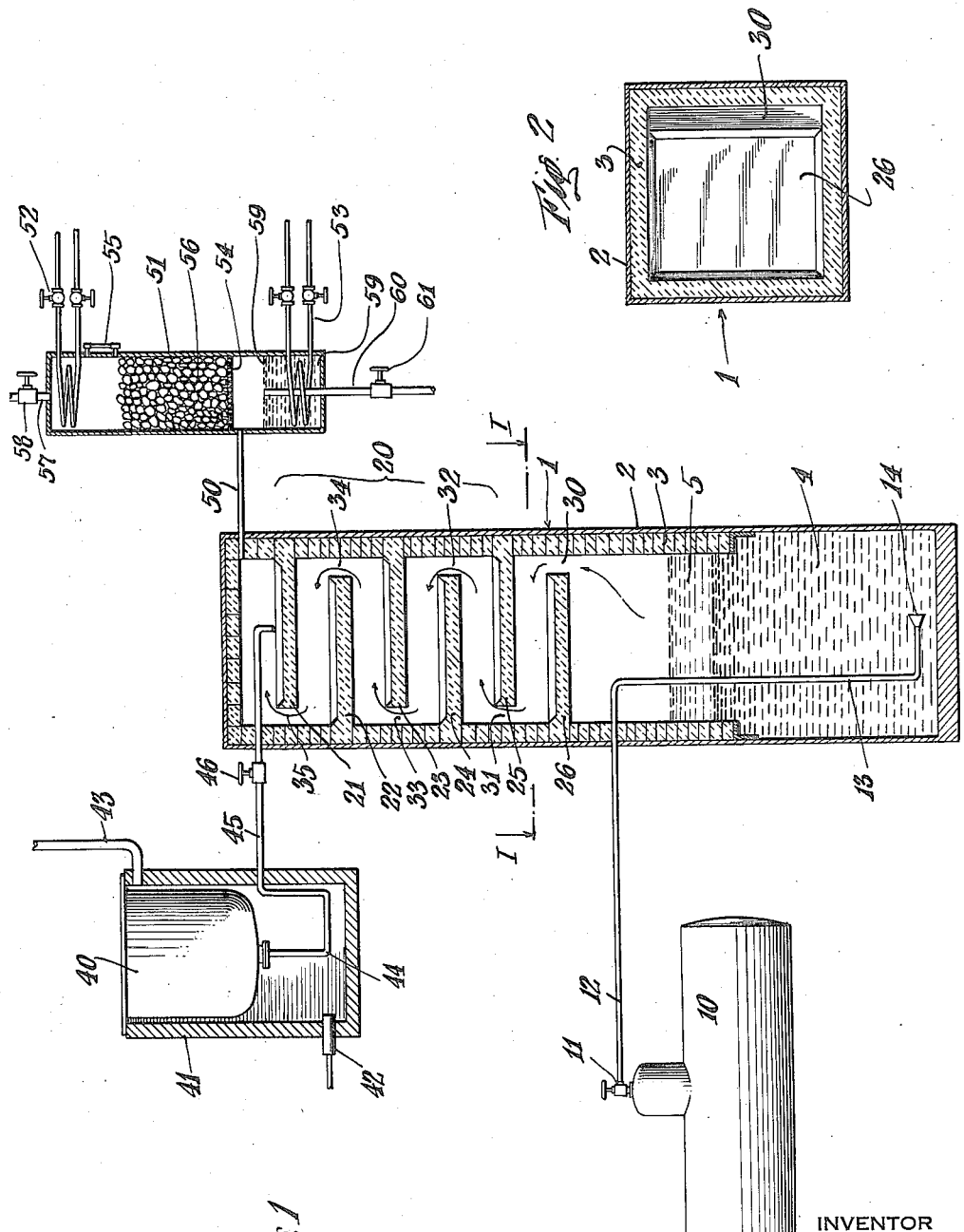

1,999,179

UNITED STATES PATENT OFFICE 1,999,179

METHOD OF MAKING TIN TETRACHLORIDE

Louis Burgess, New York, N. Y., assignor to William P. Alexander, Ridgewood, N. J.

Application July 27, 1932, Serial No. 625,169

7 Claims. (Cl. 23—98)

The invention will be fully understood from the following description read in conjunction with the drawing, in which, Fig. 1 is a vertical section through apparatus in which the invention may be carried into effect, and Fig. 2 is a horizontal section through Fig. 1 on the plane indicated by I—I.

1 designates a reaction tower comprising the outer shell 2, which may for example be formed of steel, and is preferably provided with the refractory liner 3. The tower 1 is adapted to hold a pool 4 of molten tin in the lower part thereof. Provision is made for the continuous introduction of chlorine under pressure to this pool beneath the surface thereof and adjacent the base of the tower 1. Such provision comprises the tank 10, which may for example be a tank car body adapted to transport liquid chlorine. The tank is controlled by the valve 11, connected through the pipe 12 to the distributor 13, which discharges adjacent the base of the tower 1. The tower is also provided with a series 20 of horizontal trays 21 to 26 inc. These trays may be formed of refractory material bonded into the refractory liner 3. The trays do not entirely span the tower, but terminate a short distance before reaching the opposite wall, thereby forming a series of staggered openings 30, 31, 32, 33, 34 and 35. These openings, in combination with the tower, form a tortuous path so that gas passing upwardly through the tower passes horizontally over the surface of the trays.

It will of course be understood that the trays could alternatively span the entire tower and carry within themselves staggered openings vertically disposed, adapted to perform the same function. Suitable provision is also made for the introduction of liquid tin adjacent the upper part of the tower. This comprises the melting pot 40, surrounded by the refractory setting 41, heated by the burner 42. Products of combustion escape through the stack 43. The pot 40 discharges through the trap 44 and pipe 45, controlled by valve 46, onto the surface of the uppermost tray 21. In charging the apparatus, sufficient liquid tin is introduced to fill all of the trays and in addition to form a pool of substantial depth in the base of the tower 1, which may for example overlay the outlet 14 for a distance of from one to three feet at the commencement of operations. Products of the reaction escape from the tower through the outlet 50 which is connected into the mid-section of the tower 51. The tower 51 carries cooling coil 52 adjacent the top thereof and heater coil 53 adjacent the bottom thereof. The tower 51 is spanned by the grate 54, and before operation a number of small ingots of tin are passed in through the manhole 55 to form a mass 56 of divided solid tin resting on the grate 54 up through which the reaction products pass.

In operation, the tower 1 is charged with liquid tin, as aforesaid, and a continuous supply of chlorine is passed in by manipulation of valve 11. This bubbles up through the liquid tin in the base of the tower, thereby forming a reaction mixture which may contain tin dichloride, tin tetrachloride and chlorine. If operations are commenced with a relatively thick layer of tin overlaying the outlet 14, tin dichloride appears to predominate; and as the layer of tin becomes of diminished thickness, the reaction products consist principally of tin dichloride with a minor proportion of chlorine. The chlorine and tin tetrachloride are normally gaseous at the temperatures involved, and tin dichloride will usually have sufficient vapor pressure to pass in part upwardly in the gas. Some of the tin dichloride will separate out in liquid or semi-liquid form as a layer 5 floating on the surface of the pool 4. Where the tin dichloride is present as a component of the gas, it will deposit on the upper surface of the trays 21 to 26 inc.

I am aware that tin tetrachloride has been heretofore made by passing chlorine over the surface of liquid tin, and, alternatively, by passing chlorine through liquid tin. Both these methods have, however, certain limitations, and the new method herein described has specific advantages not possessed by either of the older methods. For example, in making tin tetrachloride by passing chlorine through molten tin, a very compact apparatus of small dimensions may be used, but the reaction is not ordinarily complete in the desired direction. Unless the temperature of operation and depth of metal are carefully controlled, the reaction either runs to the production of tin dichloride or to the production of tin tetrachloride with unreacted chlorine. As the level of the liquid tin is lowered, the proportion of chlorine tends to increase and this of course results in an increased proportion of chlorine in the tin tetrachloride recovered from the system.

In accordance with my process, the gas produced by passing chlorine through the liquid tin in the pool 4 is then passed in succession over the surface of the liquid tin laying on the trays 21 to 26. During the early stages of the reaction, and/or where the conditions are so adjusted as to produce tin dichloride, this deposits and overlays the molten tin carried by the trays. During the latter stages of the reaction, products coming from the base of the tower contain free chlorine. This chlorine will react with the tin dichloride which overlays the molten tin on the trays. If the tin dichloride is not present or has become exhausted, the chlorine will react directly with the molten tin itself. Furthermore, inasmuch as the chlorine principally attacks the molten tin in the pool 4, the tin laying on the trays 21 to 26 will not be heavily attacked until the tin in the pool has become at least partially exhausted, and for this reason the tin laying on the trays presents a substantially uniform reactive surface during the entire period of operation. While of course charging of molten tin may be continuously effected, I find it somewhat more convenient to do so intermittently, relying upon the tin carried by the trays to maintain the system at a point of high efficiency during the entire cycle.

In practice, the trays and their contents, as well as the gas mixture passing over the same, will ordinarily be at a temperature of from 235 to 400° C.; whereas the liquid tin in the pool 4, owing to the heat generated by the reaction, may be at a temperature of from 300 to 700° C. and will ordinarily be at a temperature of from 300 to 500° C.

The gas passing from the system through the outlet 50 will normally consist almost exclusively of tin tetrachloride and may contain a small proportion of chlorine which is not desirable in the finished product. It is of course possible to pass this gas over solid tin with the result of at least partially reacting the chlorine and the tin. This is somewhat complicated by the diluent effect of the tin tetrachloride and by the solvent effect of liquid tin tetrachloride if condensation is simultaneously attempted.

In my apparatus the gas passes upwardly in the tower 51 through the mass 56 of solid divided tin. In the upper part of the tower, tin tetrachloride is continuously condensed by means of water passing through the coil 52, so that the tin tetrachloride flows downwardly over the solid divided tin in counter current contact to the gas. Inasmuch as the tin tetrachloride is continuously condensed, it does not carry the chlorine out of the system, and the gas passing off through the pipe 57, controlled by valve 58, is merely the small proportion of unreactive gas which may, for example, be air present in the apparatus on starting up. The condensed tin tetrachloride flows downwardly into the base 59 of the tower 51. The chlorine is principally driven out of the condensate by the heat of the gas coming in through the pipe 50. If under the operating conditions this heat is not sufficient to entirely drive out the chlorine, or to eliminate the tendency of the tin tetrachloride to dissolve fresh chlorine out of the gas, use is made of the heater coil 53. This may, for example, be supplied with steam under pressure sufficient to boil the tin tetrachloride in the base 59 of the tower 51, thereby driving off every trace of chlorine contained therein. This chlorine, together with the small amount of tin tetrachloride vaporized, passes upwardly in the tower 51 so that the chlorine is continuously forced into contact with the mass 56 of divided tin until complete reaction has occurred. Any excess of tin tetrachloride over that necessary to maintain the pool 59 in the base of the tower 51 is withdrawn through the overflow pipe 60 controlled by the valve 61.

The foregoing description is for purposes of illustration and not of limitation, and it is therefore my intention that the invention be limited only by the appended claims or their equivalents, wherein I have endeavored to claim broadly all inherent novelty.

I claim:

1. Process of generating tin tetrachloride, which comprises passing chlorine upwardly through a first body of molten tin, thereby producing a gas containing tin chloride and chlorine, thereafter passing said gas in a generally horizontal direction over the surface of a body of molten tin separate and independent from said first body, and thereafter conducting away the said gas and condensing the tin tetrachloride contained therein.

2. Process of generating tin tetrachloride, which comprises passing chlorine upwardly through a first body of molten tin, thereby producing a gas containing tin chloride and chlorine, thereafter passing said gas in a generally horizontal direction over the surface of a body of molten tin separate and independent from said first body while maintaining a temperature of not exceeding 400° C., and thereafter conducting away the said gas and condensing the tin tetrachloride contained therein.

3. Process of generating tin tetrachloride, which comprises passing chlorine upwardly through molten tin, thereby producing a gas containing tin chloride and chlorine, thereafter passing said gas over the surface of molten tin, thereafter passing said gas over the surface of solid tin, and condensing and recovering the tin tetrachloride contained therein.

4. Process of generating tin tetrachloride, which comprises passing chlorine upwardly through molten tin, thereby producing a gas containing tin chloride and chlorine, thereafter passing said gas over the surface of molten tin while maintaining a temperature of not exceeding 400° C., thereafter passing said gas over the surface of solid tin, and condensing and recovering the tin tetrachloride contained therein.

5. Process of making tin tetrachloride, which comprises continuously contacting chlorine with liquid tin, thereby forming a gas containing tin chloride and chlorine, continuously conducting away said gas, thereafter passing said gas upwardly through a mass of divided solid tin, continuously condensing tin tetrachloride adjacent the upper part of said mass, and collecting and withdrawing condensed tin tetrachloride adjacent the lower part of said mass.

6. Process of making tin tetrachloride, which comprises continuously contacting chlorine with liquid tin, thereby producing a gas containing tin tetrachloride and chlorine, continuously withdrawing said gas, passing said gas upwardly through a mass of divided solid tin, continuously condensing tin tetrachloride adjacent the upper part of said mass, collecting condensed tin chloride adjacent the lower part of said mass, heating the said condensed tin chloride to a temperature sufficient to substantially free it of dissolved chlorine, and returning the chlorine thereby evolved to the said mass.

7. Process of making tin tetrachloride, which comprises forming a pool of liquid tin, forming a vertical series of layers of liquid tin above the said pool, said layers and pool being so arranged that an excess of molten tin supplied to any layer would overflow into the next succeeding lower layer and an excess of molten tin supplied to the lowest layer would overflow into said pool, continuously passing chlorine into said pool, thereby forming a gas containing tin tetrachloride and chlorine, passing said gas in a general upwardly direction over the surface of the said layers, thereafter conducting away said gas and condensing the tin tetrachloride contained therein, and intermittently replenishing the tin in said layers and pool by introducing molten tin adjacent the upper part of said series.

LOUIS BURGESS.